July 8, 1958

C. R. BONNELL 2,842,749

DYNAMO ELECTRIC DEVICE

Filed Sept. 4, 1953

INVENTOR.
CHARLES R. BONNELL
BY George H Fisher
ATTORNEY

United States Patent Office 2,842,749
Patented July 8, 1958

2,842,749

DYNAMO ELECTRIC DEVICE

Charles R. Bonnell, Columbia Heights, Minn., assignor to Minneapolis-Honeywell Regulator Company, Minneapolis, Minn., a corporation of Delaware Application September 4, 1953, Serial No. 378,456

13 Claims. (Cl. 336—135)

The present invention relates to dynamo electric devices and more particularly to an improved electrical signal generating apparatus having an inherent elastic restraint.

My signal generating apparatus is an improvement over prior art devices in that it provides a means for measuring torsions or displacement forces and produces a signal in proportion to the torque or force applied without requiring any external devices. Such an apparatus has great utility in the field of computers and other associated equipment in that it can be used in connection with torque or force producing devices to convert torque or force into displacement and a signal output. As such my apparatus is an improvement over the dynamo transformer shown in the patent to R. K. Mueller 2,488,734, dated November 22, 1949.

Therefore, it is an object of this invention to provide an improved dynamo electric device combining signal generating operation with an elastic restraint. It is further an object of this invention to provide in a device of this type apparatus to measure torsions or forces and produce an electrical signal output in proportion to the displacement caused by the torsion or force. It is further an object of this invention to provide in a device of this type apparatus which produces a force or torque proportional to the transtational or angular displacement of a rotor element of the apparatus which force or torque acts against input force or torque to produce an output signal as a measure of the input torque. It is still another object of this invention to provide an improved signal generator which has great application in the field of sensing devices, computing devices and servo mechanisms. These and other objects of this invention will become apparent from the reading of the attached description together with the drawings wherein:

Figure 1:
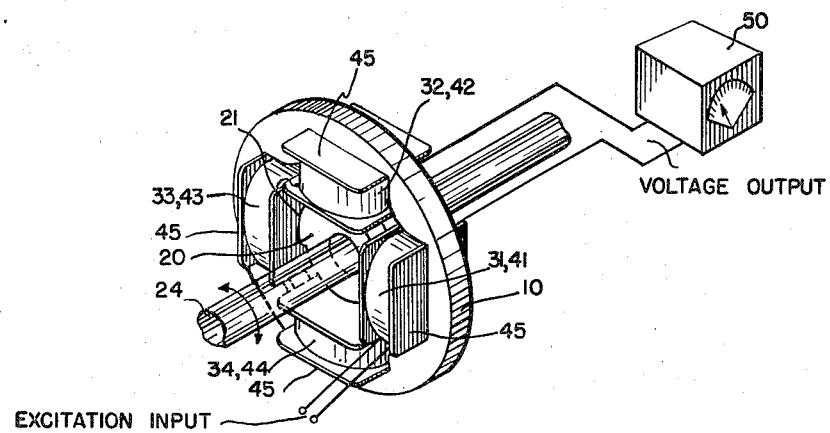
Figure 1 is a view of my improved apparatus in perspective.
Figure 2:
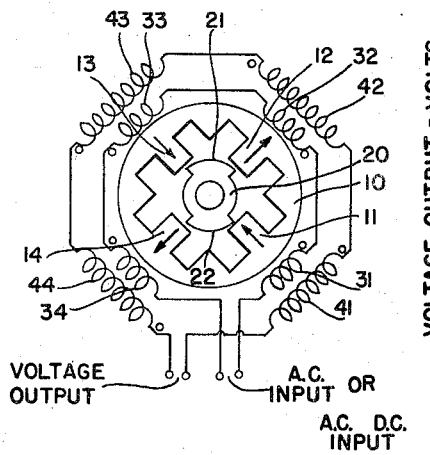
Figure 2 is a schematic disclosure of the stator and rotor element of my dynamo electric device together with a wiring diagram of the same.

My improved signal generating device is shown in Figures 1 and 2 as comprising a stator indicated generally at 10 which should preferably be constructed of laminated magnetic material. The stator is generally circular in shape having four pole members 11, 12, 13, and 14 of the salient type. Positioned within or between the poles which are machined to provide a substantially circular opening therebetween is a rotor element 20 also of laminated magnetic material having a pair of sector-like pole pieces 21, 22. Rotor 20 is made of a suitable magnetic material such as soft iron which is not permanently magnetized and the rotor is adapted to be mounted on a shaft indicated generally at 24 and positioned within the air gap between the poles 11–14 for rotated movement relative therethrough, the shaft being journaled by suitable bearing means, not shown. The pole portions 21 and 22 of the rotor are adapted to be normally positioned in a neutral position where each spans the distance between centers of two adjacent poles or as is shown in Figures 1 and 2 the pole 21 is positioned midway between poles 12 and 13 and the rotor pole 22 is positioned between poles 11 and 14 of the stator. The pole faces of 21 and 22 of the rotor are adapted to be machined or suitably surfaced to provide an accurately uniform air gap between the rotor and the poles adjacent thereto.

Each of the poles 11–14 carries a pair of windings as will be seen in Figure 2. Thus pole 11 mounts windings 31 and 41; pole 12, 32 and 42; pole 13, windings 33 and 43; and pole 14, windings 34 and 44. The windings 31–34 are serially connected to provide the excitation for the signal generator and will be described as a pattern field. Common extremities of the windings are marked with a dot and hence it will be seen that the method of connecting the pattern field or windings or the relationship of the windings with respect to one another differ from the serially connected windings 41–44 which combine to make the output or secondary winding of the device. In Figure 1 it will be seen that the respective windings 31, 41, etc. for each pole are mounted on a single spool of insulating material 45 which in turn is positioned on the respective pole. The pattern field winding is adapted to be energized either from an alternating current, or alternating current and superimposed direct current source of power. When energized the pattern field windings provide a magnetomotive force pattern such as is shown by the arrows on the respective poles in Figure 2 to combine with the rotor 20 or act upon the rotor 20 restraining the same toward the neutral position wherein the poles 21 and 22 of the rotor 20 are positioned midway between respective stator poles. The connections of the secondary windings are such that if the secondary winding were directly energized, the magnetomotive force pattern on the poles produced thereby would be such as to direct the flux in all poles either toward or away from the rotor and not as in the case of the pattern field winding directing the flux toward the rotor on diametrically opposed poles and away from the rotor on the opposite diametrically opposed poles displaced 90 degrees therefrom. As disclosed in the Mueller patent referred to above, the pattern field winding produces an elastic restraint on the rotor tending to maintain the same in a predetermined position described herein as the neutral position. Both the A. C. energization and the D. C. superimposed on A. C. provide the same m. m. f. pattern and the same type of restraint, the D. C. excitation increasing the amount of restraint, however. In the subject apparatus, the alternating component of the pattern field further provides excitation for the secondary windings 41–44. Torsional input supplied to the shaft 24 with the rotor 20 thereon will act against the elastic restraint of the field pattern tending to displace the rotor until the input torque and the restraint are in balance. The displacement resulting therefrom, depending upon which direction it may be from the neutral position of the rotor, will cause one or the other of the pairs of secondary windings on diametrically opposed poles to be energized with an increased induced voltage from the respective pattern field winding on the respective pole and will reduce the energization through electromagnetic induction on the opposite diametrically opposed poles such that the serially connected secondary windings will have an output induced therein which will vary in magnitude and be of one phase or the other depending upon the displacement of the rotor. The output can be utilized for controlling functions or can be indicated on a meter, such as 50, in Figure 1. It will be seen from the magnetomotive force pattern of the pattern field winding or the respective connections of the pattern field coils with respect to the connections of the secondary windings associated therewith that the induced voltage in one set of coils will have a one polarity and the opposite set of diametrically opposed coils will have a voltage induced therein of an opposite polarity or phase.

Figure 3:
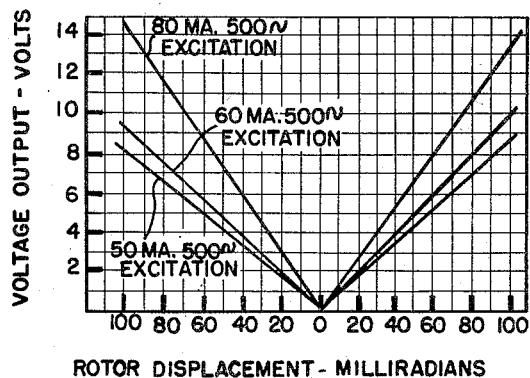
Figures 3 and 4 are respectively graphic disclosures of the ratios of signal output and restraint from my improved dynamo electric device in relation to rotor position or rotor displacement.
Figure 4:
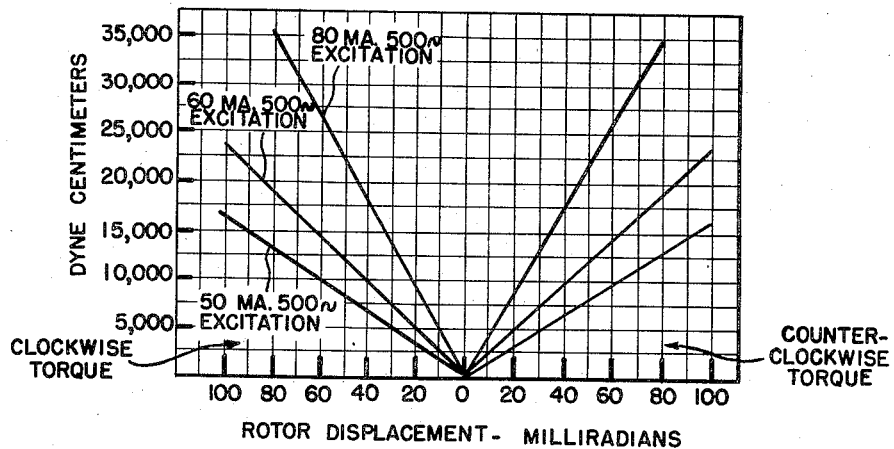

In Figure 3 is shown a graph disclosing the relationship between voltage output versus displacement of rotor 20, and in Figure 4 is shown a graph of restraint versus rotor displacement. The excitation used for these plots was A. C. energization only, and it will be seen that the relationship between restraint versus rotor displacement is the same as the relationship of voltage output versus rotor displacement. As shown in Figure 3, the displacement of the rotor from the neutral position causes an output which is substantially linear over the range of displacement of the rotor. Thus it will be seen that input torsions applied to the rotor are restrained by the elastic restraint resulting in displacements of the rotor with respect to the stator poles in proportion to the magnitude of the input torsion and producing in the secondary windings of the device an output which is variable in magnitude and reversible in phase. It will also be noted that with the particular coil relationship with the pattern field in producing elastic restraint pattern or the magnetomotive force pattern through which the elastic restraint of the device is obtained, that displacement of the rotor from the neutral position does not appear to vary the reluctance of the normal flux paths through the rotor, the poles and the remaining portion of the stator. Thus it will be seen that as the rotor is displaced in one direction or the other from the neutral position, that the stator poles adjacent the same rotor pole will have the amount of iron decreased at one portion of the magnetic path and increased at the other for either direction of displacement. Thus it would normally seem that with this particular arrangement, the output of the apparatus would remain constant or be negligible. However, fringe or leakage flux threading the respective coils on the various poles of the stator produce a result not normally expected from a device of this type. With this arrangement, the pole toward which the rotor is moved will have the greater amount of flux flow therethrough and consequently the induced voltage in the secondary winding will be increased even though the major flow of flux through the outer periphery of the stator is substantially unchanged by displacement of the rotor. Thus even though the output of my improved signal generator is somewhat reduced from that of similar devices for the same degree of excitation, the output is of such magnitude that it is usable without additional amplifying devices to provide a very desirable and useful type of dynamo electric device. For example, we have found that with an 80 milliampere 500 cycle excitation on the pattern field that the usable voltage output can be obtained from the secondary winding of approximately 10 to 15 volts. The torque output of the pattern field varies with the position of the rotor and with the similar excitation reaches a maximum operating range of from 25 to 35 thousand dyne centimeters. Thus it will be seen that my improved signal generator with elastic restraint operates in a range of values suitable for computing and servo mechanism functions.

Figure 5:
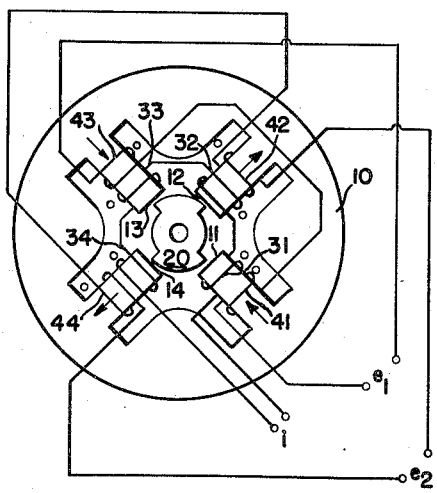
Figure 5 is a schematic disclosure of another embodiment of the invention designed to measure forces along a pair of axes.

The embodiment shown in Figure 5 utilizes the same stator 10 and rotor 22 elements as the preceding embodiment with the exception that the secondary windings are connected in a modified manner such as will become evident as the disclosure proceeds. As in the previous embodiments, the primary windings 31–34 are adapted to be energized from an alternating current source of power and are connected in such a manner as to produce the restraint pattern designed to position the rotor in the predetermined relationship with respect to the stator. The secondary windings instead of being serially connected and wound in the same manner such that their results will be additive are connected as shown in Figure 5 in the following manner. Windings 41 and 43 are connected such that the outputs of the windings are subtracted, the two windings in series relationship providing an output which will indicate direction and magnitude of force on the device along an axis aligned with the poles 11 and 13. Similarly, the secondary windings 42 and 44 are serially connected in a subtractive relationship, the output from these two windings in series relationship defining the induced signal which varies with force and direction of force applied to the device along the axis defined by the poles 12 and 14. In this embodiment, the rotor is not designed to rotate relative to the poles but rather to be displaced relative to the poles along a pair of axes one of which is defined by poles 11 and 13 and the other by poles 12 and 14. The output voltages from these pairs of windings correspond to components of acceleration in the plane of the rotor along these axes and as will be evident could be used for vertical reference signals. The rotor element 22 is adapted to be mounted or suspended by a shaft or wire such as to respond to the forces along the axis heretofore defined to be displaced relative to the respective poles. In this embodiment as in the previous embodiment, the restraint pattern operates to restrain the rotor to its original position and displacement of the rotor against the restraint operates to vary the voltage induced in the respective pairs of windings, this voltage output being reversible in phase and variable in magnitude and substantially linear throughout its displacement range. Should the rotor be suspended by means of a wire located in a vertical plane, the apparatus will operate as a two-axis pendulus reference or accelerometer. The operation of the device is the same as that defined by the previous embodiment in that the secondary windings have voltages induced therein depending upon the direction and amount of displacement of the rotor. In this embodiment, the rotor may take the same shape as that of the beforementioned embodiment or may be cruciform in shape, with the extremities of the rotor aligning with the respective poles. This variation in rotor shape modifies slightly the output of the device but does not vary to a degree the operativeness of the same.

In considering this invention it should be kept in mind that the present disclosure is illustrative only and that the scope of the invention should be determined only by the appended claims.

I claim as my invention:

1. A dynamo electric device comprising: a stator having four symmetrically disposed poles, a movable element of magnetic material mounted within the stator and having a neutral position with respect to the poles, the movable element being capable of limited movement from said neutral position, one set of windings being associated with all four poles and connected to produce a magnetomotive force pattern in which the magnetomotive forces are directed inwardly for two opposing poles and outwardly in the other two opposing poles, and a second set of windings associated with all four poles and being serially connected in such a manner that the voltage induced therein from the flux of said magnetomotive force pattern of said first set of windings are of one sense in one pair of diametrically opposed windings and the opposite sense in the other pair of diametrically opposed windings.

2. A dynamo electric device comprising: a stator having four symmetrically disposed poles, a movable element of magnetic material mounted within the stator and having a neutral position with respect to the poles, the movable element being capable of limited movement from said neutral position, a first set of windings mounted on all four poles of said stator and connected such that the sense of diametrically opposed windings are the same and the sense of windings 90 degrees displaced from the first named windings are reversed from said first named windings, a second set of windings mounted on all four poles of said stator and connected such that the sense of all of the windings of the second set are in the same direction, said first set of windings being adapted to be energized by an alternating current source of power and provide a magnetomotive force pattern which produces a restraint on said movable element and induces in said second set of windings a signal output which is reversible in phase and linear in magnitude upon displacement of said movable element from said neutral position.

3. A dynamo electric device comprising: a stator having four symmetrically disposed poles, a movable element of magnetic material mounted within the stator and having a neutral position with respect to the poles, the movable element being capable of limited rotational movement from said neutral position, a first set of windings mounted on all four poles of said stator and being serially connected such that the sense of diametrically opposed windings are the same and the sense of windings 90 degrees displaced from the first named windings are reversed from the first named windings, a second set of windings mounted on all four poles of said stator and being serially connected such that the sense of all of the windings of the second set are in the same direction, said first set of windings being adapted to be energized by an alternating current source of power and provide a magnetomotive force pattern which produces a restraint on said movable element and induces in said second set of windings a signal output which is reversible in phase and linear in magnitude upon displacement of said movable element from said neutral position.

4. A dynamo electric device comprising: a stator having four symmetrically disposed poles, a movable element of magnetic material mounted within the stator and having a neutral position with respect to the poles, the movable element being capable of limited movement from said neutral position, a first set of windings mounted on all four poles of said stator and connected such that the sense of diametrically opposed windings are the same and the sense of windings 90 degrees displaced therefrom are reversed from said first named windings, a second set of windings mounted on all four poles of said stator and wound such that the sense of all of the windings of the second set are in the same direction.

5. A dynamo electric device comprising: a stator having four symmetrically disposed poles, a movable element of magnetic material mounted within the stator and having a neutral position with respect to the poles, the movable element being capable of limited rotational movement from said neutral position, one set of windings being associated with all four poles and connected to produce a magnetomotive force pattern in which the magnetomotive forces are directed inwardly for two opposing poles and outwardly in the other two opposing poles, and a second set of windings associated with all four poles and being serially connected in such a manner that the voltage induced therein from the flux of said magnetomotive force pattern of said first set of windings are of one sense in one pair of diametrically opposed windings and the opposite sense in the other pair of diametrically opposed windings.

6. A dynamo electric device comprising: a stator having four symmetrically disposed poles, a movable element of magnetic material mounted within said stator and having a neutral position with respect to said poles, the movable element being capable of limited rotational movement from said neutral position, a first set of windings being associated with all four poles and being connected to produce a magnetomotive force pattern in which the magnetomotive forces are directed inwardly for two opposing poles and outwardly in the other two opposing poles, and a plurality of secondary windings mounted respectively on said four poles and wound in the same direction as the associated winding of the first set on two of said poles and in the opposite direction to the windings of the first set on the remaining two poles two of said windings having a large voltage output induced therein as said movable element is rotated in one direction from said neutral position and the opposite two windings having a large voltage output induced therein as said movable element is rotated in the opposite direction from said neutral position.

7. A dynamo electric device comprising: a stator having four symmetrically disposed poles, a movable element of magnetic material mounted within said stator and having a neutral position with respect to said poles, the movable element being capable of limited rotational movement from said neutral position, a first set of windings being associated with all four poles and being connected to produce a magnetomotive force pattern in which the magnetomotive forces are directed inwardly for two opposing poles and outwardly in the other two opposing poles, and a plurality of secondary windings mounted respectively on said four poles and wound in the same direction as the associated winding of the first set on two of said poles and in the opposite direction to the windings of the first set on the remaining two poles two of said windings having a large voltage output induced therein as said movable element is rotated in one direction from said neutral position and the opposite two windings having a large voltage output induced therein 180° out of phase with the first named voltage as said movable element is rotated in the opposite direction from said neutral position, the voltage output of said windings being linear with respect to said rotational movable element.

8. A dynamo electric device comprising: a stator having four symmetrically disposed poles, a movable element of magnetic material mounted within said stator and having a neutral position with respect to said poles, the movable element being capable of limited rotational movement from said neutral position, a first set of windings being associated with all four poles and being connected to produce a magnetomotive force pattern in which the magnetomotive forces are directed inwardly for two opposing poles and outwardly in the other two opposing poles, and a plurality of secondary windings mounted respectively on said four poles and wound in the same direction as the associated winding of the first set on two of said poles and in the opposite direction to the windings of the first set on the remaining two poles two of said windings having a large voltage output induced therein as said movable element is rotated in one direction from said neutral position and the opposite two windings having a large voltage output induced therein 180° out of phase from the first named voltage as said movable element is rotated in the opposite direction from said neutral position, the induced voltage output of said windings being linear with respect to rotational movement of said movable element and generated substantially by leakage flux from the magnetomotive force pattern of said first set of windings.

9. A dynamo electric device comprising: a stator having four symmetrically disposed poles, a movable element of magnetic material mounted within the stator and having a neutral position with respect to the poles, the movable element being capable of limited movement from said neutral position, a first set of windings mounted on all four poles of said stator and connected such that the sense of diametrically opposed windings are the same and the sense of windings 90 degrees displaced therefrom are reversed from said first named windings, said first set of windings being energized from an alternating current source of power, and a plurality of secondary windings mounted respectively on said four poles of said stator and adapted to have a signal voltage induced therein from said windings of said first set.

10. A dynamo electric device comprising: a stator having four symmetrically disposed poles, a movable element of magnetic material mounted within the stator and having a neutral position with respect to the poles, the movable element being capable of limited movement from said neutral position, a first set of windings mounted on all four poles of said stator and connected such that the sense of diametrically opposed windings are the same and the sense of windings 90 degrees displaced therefrom are reversed from said first named windings, said first set of windings being energized from an alternating current source of power, and a plurality of secondary windings mounted respectively on said four poles of said stator and adapted to have a signal voltage induced therein from said windings of said first set, the secondary windings on diametrically opposed poles being serially connected in a subtractive relationship.

11. A dynamo electric device comprising: a stator having four symmetrically disposed poles, a movable element of magnetic material mounted within the stator and having a neutral position with respect to the poles, the movable element being capable of limited movement from said neutral position, a first set of windings mounted on all four poles of said stator and connected such that the sense of diametrically opposed windings are the same and the sense of windings 90 degrees displaced therefrom are reversed from said first named windings, said first set of windings being energized from an alternating current source of power, and a plurality of secondary windings mounted respectively on said four poles of said stator and adapted to have a signal voltage induced therein from said windings of said first set, the secondary windings on diametrically opposed poles being serially connected in a subtractive relationship, said movable element upon displacement relative to the stator poles operating to cause a signal to be induced in the serially connected secondary windings on said diametrically opposed poles.

12. A dynamo electric device comprising: a stator having four symmetrically disposed poles, a movable element of magnetic material mounted within the stator and having a neutral position with respect to the poles, the movable element being capable of limited movement from said neutral position, a first set of windings mounted on all four poles of said stator and connected such that the sense of diametrically opposed windings are the same and the sense of windings 90 degrees displaced therefrom are reversed from said first named windings, said first set of windings being energized from an alternating current source of power, and a plurality of secondary windings mounted respectively on said four poles of said stator and adapted to have a signal voltage induced therein from said windings of said first set, the secondary windings on diametrically opposed poles being serially connected in a subtractive relationship, said rotor upon displacement relative to said stator poles operating to cause a signal to be induced in the serially connected secondary windings on said diametrically opposed poles which signal output is proportional to the force applied to said rotor in the direction of said poles upon which the respective secondary windings are located.

13. An accelerometer comprising, a stator having four symmetrically disposed poles, a movable element of magnetic material mounted within said stator and having a neutral position with respect to said poles, the movable element being supported by flexible means for limited displacement from said neutral position and relative to said poles, a first set of windings mounted on said poles of said stator and connected such that the sense of diametrically opposed windings are the same and the sense of windings 90 degrees displaced therefrom are reversed from said first named windings, secondary windings positioned on each of said respective poles, means connecting the secondary windings on diametrically opposed poles in a series subtractive relationship, said movable element being responsive to acceleration forces along the axial lines defined by diametrically opposed poles for varying the signals induced in the secondary windings mounted on said respective diametrically opposed poles, the output of said serially connected secondary windings being proportional to the acceleration force and variable in phase depending upon the direction of acceleration along the axes defined by the diametrically opposed poles.

References Cited in the file of this patent
UNITED STATES PATENTS 2,488,734     Mueller _____ Nov. 22, 1949